United States Patent [19]

Rhodes et al.

[11] Patent Number: 4,762,655

[45] Date of Patent: Aug. 9, 1988

[54] METHOD OF SINTERING TRANSLUCENT ALUMINA

[75] Inventors: William H. Rhodes, Lexington; George C. Wei, Weston, both of Mass.; George A. Fryburg, Newmarket, N.H.

[73] Assignee: GTE Laboratories Incorporated, Waltham, Mass.

[21] Appl. No.: 802,414

[22] Filed: Nov. 27, 1985

[51] Int. Cl.[4] ............................................. C04B 35/10
[52] U.S. Cl. ........................................ 264/65; 264/66; 264/85; 501/127; 501/153
[58] Field of Search ............................ 264/65, 66, 85; 501/127, 153; 423/625; 313/636

[56] References Cited

U.S. PATENT DOCUMENTS

| | | | |
|---|---|---|---|
| 3,025,177 | 3/1962 | St. Pierre | 23/142 |
| 3,026,210 | 3/1962 | Coble | 106/39 |
| 3,377,176 | 4/1968 | Walkodoff et al. | 166/46 |
| 3,588,573 | 6/1971 | Chen et al. | 313/221 |
| 3,711,585 | 1/1973 | Muta et al. | 264/65 |
| 3,718,601 | 2/1973 | Dentai et al. | 252/301.4 R |
| 3,792,142 | 2/1974 | Kobayashi et al. | 264/65 |
| 3,834,915 | 9/1974 | Cleveland et al. | 106/73.4 |
| 3,905,845 | 9/1975 | Kobayashi et al. | 106/62 |
| 4,204,874 | 5/1980 | Yamada | 106/73.4 |
| 4,222,978 | 9/1980 | Oda et al. | 423/625 |
| 4,285,732 | 8/1981 | Charles et al. | 106/57 |
| 4,364,877 | 12/1982 | Clément et al. | 264/1.2 |
| 4,373,030 | 2/1983 | Kaneno et al. | 423/625 |
| 4,383,957 | 5/1983 | Yamakawa et al. | 264/65 |
| 4,418,024 | 11/1983 | Prochazka et al. | 264/66 X |
| 4,490,319 | 12/1984 | Lee et al. | 264/65 |
| 4,616,996 | 10/1986 | Kajihara et al. | 432/148 |

FOREIGN PATENT DOCUMENTS

| | | | |
|---|---|---|---|
| 53-47415 | 4/1978 | Japan . | |
| 53-14247 | 5/1978 | Japan | 501/127 |
| 58-36972 | 3/1983 | Japan | 501/153 |
| 1443741 | 7/1976 | United Kingdom | 423/625 |

OTHER PUBLICATIONS

Coble, *Sintering Alumina: Effects of Atmospheres*, Journal of American Cer. Soc., vol. 45, No. 3, 3–62, pp. 123–126.

M. P. Harmer et al., *Proc. 4th International Meeting On Modern Cer. Technologies*, St. Vincent, Italy, Co., Amsterdam, 1980, pp. 155–162.

*Primary Examiner*—Mark L. Bell
*Assistant Examiner*—Ann M. Knab
*Attorney, Agent, or Firm*—Frances P. Craig; Martha Ann Finnegan

[57] ABSTRACT

An improved process for producing a translucent polycrystalline alumina body comprising sintering a prefired compacted green body of alumina of predetermined shape is disclosed. The green body of alumina includes alumina doped with one or more sintering aids. The method of the present invention comprises sintering the prefired compacted green body of predetermined shape at a maximum sintering temperature in an atmosphere containing nitrogen and an amount of hydrogen greater than or equal to about 2.5 volume percent and less than 75 volume percent for a period of time sufficient to produce a translucent polycrystalline alumina body.

7 Claims, No Drawings

METHOD OF SINTERING TRANSLUCENT ALUMINA

BACKGROUND OF THE INVENTION

This invention relates to ceramic bodies and more particularly to translucent ceramic bodies containing alumina as the main ingredient.

Conventional sintering of alumina involves hydrogen or vacuum firing. For example, U.S. Pat. No. 3,026,177 to St. Pierre et al. discloses the production of a transparent alumina body by subjecting a compact of alumina to a first firing in hydrogen at 1650° C. to 1750° C. to effect removal of gas-containing pores from the body, and subjecting the body to a second firing in hydrogen at 1800° C. to 2000° C. for not less than 15 minutes to remove additional pores and improve the transparency of the body. U.S. Pat. No. 3,026,210 to Coble discloses the production of a high density alumina body having substantial transparency by forming a mixture of alumina powder and a small but effective amount up to 0.5 weight percent of magnesia powder into a compact, and firing the compact at 1700° C. to 1950° C. in vacuum or hydrogen for 2.5 to 4 hours. U.S. Pat. No. 3,905,845 to Kobayashi et al. discloses the manufacturing of translucent polycrystalline alumina body by sintering an alumina compact doped with 0.05–0.5 wt % of yttria, 0.05–0.5 wt % of lanthana, and 0.01–0.1 wt % of magnesia in vacuum, hydrogen, or ammonium decomposed gas at 1600° to 1800° C. for 5 hours. U.S. Pat. No. 4,285,732 to Charles et al. discloses the production of a translucent alumina body by sintering an alumina compact doped with magnesia (0.03 to 0.15 wt %) and an additive selected from $ZrO_2$ (0.0002 to 0.07 wt %) and $HfO_2$ (0.003 to 0.12 wt %) in hydrogen at 1750° to 1950° C. for 3 hours. The cost of such firing is high. Hydrogen is an expensive gas, and use of hydrogen further requires that special furnaces equipped with safety provisions be used. In the case of vacuum firing, high-cost vacuum furnaces are required.

SUMMARY OF THE INVENTION

In accordance with the present invention, there is provided an improved process for producing a translucent polycrystalline alumina body comprising sintering a prefired compacted green body of alumina of predetermined shape. The green body of alumina comprises alumina doped with one or more sintering aids. The method of the present invention comprises sintering the prefired compacted green body of predetermined shape at a maximum sintering temperature in an atmosphere containing nitrogen and an amount of hydrogen greater than or equal to about 2.5 volume percent and less than 75 volume percent for a period of time sufficient to produce a translucent polycrystalline alumina body.

For a better understanding of the present invention together with other and further objects, advantages, and capabilities thereof, reference is made to the following disclosure and appended claims.

DETAILED DESCRIPTION

Translucent polycrystalline alumina bodies are prepared by the process of the present invention. The process of the present invention comprises sintering a prefired compacted green body of predetermined shape at a maximum sintering temperature in an atmosphere containing nitrogen and an amount of hydrogen greater than or equal to about 2.5 volume percent and less than 75 volume percent for a period of time sufficient to produce a translucent polycrystalline alumina body, the green body consisting of alumina and one or more sintering aids.

In a preferred embodiment, the use of flowing, rather than non-moving, gas as the sintering atmosphere significantly enhances the in-line transmittance of the product of the method.

Maximum sintering temperatures typically fall within the range of from about 1700° C. to about 2000° C., with sintering times being from about 30 minutes to about 6 hours.

The use of a sintering atmosphere containing nitrogen and an amount of hydrogen greater than or equal to about 2.5 volume percent and less than 75 volume percent creates a significant economic advantage as well as safety advantage over using pure hydrogen. Because hydrogen is an expensive gas, reducing the amount of hydrogen in the sintering atmosphere to an amount greater than or equal to about 2.5 and less than 75 volume percent results in a substantial cost savings. Additionally, a reduction in the amount of hydrogen in the sintering atmosphere improves the overall safety of the process. This is especially true when the amount of hydrogen used is less than the explosive limit of 18 volume percent hydrogen.

In preparing the green body, a particulate homogeneous or at least substantially homogeneous dispersion of alumina powder and at least one sintering aid is formed. Examples of sintering aids include MgO, $Y_2O_3$, $La_2O_3$, $ZrO_2$, $HfO_2$, $Yb_2O_3$, and mixtures thereof. MgO is the most effective of these sintering aids. Alternatively, in the present process, if desired, an inorganic or organic precursor of the sintering aid can be used. The precursor should decompose to form the oxide and by-product gas or gases before sintering proceeds to the closed pore stage. Representative of the precursors of the sintering aids useful in the present process are the carbonates, hydroxides, nitrates, and stearates of magnesium, yttrium, lanthanum, zirconium, hafnium, and ytterbium.

In carrying out the present process, the alumina can be of commercial or technical grade. Specifically, it should not contain any impurities which would have a significantly deleterious effect on the desired optical transmission properties of the resulting sintered product. Preferably, the alumina powder used is at least about 99.96% pure. Most preferably, the alumina powder used is about 99.99% pure and contains about 65% by weight alpha-aluminum oxide and about 35% by weight gamma-aluminum oxide.

The alumina and sintering aids, or the precursors for the sintering aids, can be admixed by a number of techniques, such as, using a propeller mixer for wet mixing to produce a significantly or substantially uniform or homogeneous dispersion or mixture. The more uniform the dispersion, the more uniform is the microstructure, and therefore, the properties of the resulting sintered body.

Mixing may be carried out with the charge suspended in a liquid medium in which the additives are dissolved. Typical liquids include water. Mixing time varies widely and depends largely on the amount and type of mixing equipment. In general, mixing time ranges from about 1 hour to about 200 hours. The mixed material can be dried by a number of conventional techniques to remove the liquid medium. Preferably, it is dried by spray drying.

In the present dispersion, the average crystallite size ranges from about 0.05 micron, i.e., a mean specific area of about 30 m²/g, to less than one micron. An average crystallite size less than about 0.01 micron is not useful since it is generally difficult or impractical to compact the powder to densities of at least 30% of the theoretical. On the other hand, an average crystallite size of one micron or higher will produce a ceramic body with a final density lower than the theoretical density of sapphire.

A number of techniques can be used to shape the powder mixture, i.e., homogeneous dispersion, into a green body. For example, it can be extruded, injection molded, die-pressed, isostatically pressed, or slip cast to produce the green body of desired shape. Any lubricants, binders, or similar materials used in shaping the powder mixture should have no significant deteriorating effect on the resulting sintered body. Such materials are preferably of the type which evaporate on heating at relatively low temperatures, preferably below 500° C., leaving no significant residue. The green body should have a density of at least 30%, and preferably 45% or higher, of the theoretical density of 3.986 g/cc for alumina, to promote densification during sintering and achieve attainment of theoretical density.

Preferably, before sintering, the green body or compact is prefired in an oxygen-containing atmosphere such as air at a temperature ranging from about 800° C. to about 1300° C. Most preferably, the prefiring temperature is about 1200° C. to eliminate impurities including shaping aids and water which would have a significantly deleterious effect on the optical translucency of the sintered body. The particular prefiring temperature and period is determinable empirically and depends largely on the level of impurities present and on the thickness of the body, and generally ranges from about one to five hours. Such prefiring allows the sintering atmosphere to be free of impurities, and imparts sufficient strength to the compact allowing it to be more easily handled and machined.

The alumina powder used in the examples of Table I was a high-purity (99.99%), fine $Al_2O_3$ powder with an ultimate particle size of 0.05 micron and a specific surface area of 30 m²/g. The mean agglomerate size was less than 2 microns. The powder contained 65% alpha-$Al_2O_3$ and 35% gamma-$Al_2O_3$. Other types of high-purity, fine $Al_2O_3$ powders from commercial sources could be used.

Dopants were added by mixing the alumina in water solutions of $Mg(NO_3)_2$ alone, or $Mg(NO_3)_2$ plus $Y(NO_3)_3$, or $Mg(NO_3)_2$ plus $Zr(NO_3)_4$. The resulting slurry was spray dried. Green compacts in the form of tubes were made by cold isostatic pressing. The green tubes were prefired at 1200° C. in air for 2 hours.

Table I lists the results of a study to measure the effect of atmosphere upon the sintering of polycrystalline alumina. Polycrystalline alumina tubes doped with the additive concentrations of 500 ppm MgO and 500 ppm $Y_2O_3$ were sintered in a horizontal alumina tube furnace (heated by a graphite heater, 2.4 inch ID by 8 inch long) under an atmosphere of flowing $N_2$—$H_2$ at various $H_2$ contents. The gas flow rate through the muffle tube (1.75 inch ID) of the furnace was 2 liters per minute, corresponding to a linear gas velocity of 1.29 meters per minute. The sintering temperature was 1700° C., 1750° C. or 1850° C., reached by heating at a rate of 0.16° C./s.

TABLE I

RESULTS OF SINTERING ALUMINA DOPED WITH 500 PPM MgO AND 500 PPM $Y_2O_3$

| Sintering Atmosphere | Sintering Temperature (°C.) | Time (h) | Transmittance % Total | In-Line |
|---|---|---|---|---|
| $N_2$—74% $H_2$ | 1700 | 3 | 96.2 | 10.75 |
| $N_2$—35% $H_2$ | 1700 | 3 | 96.5 | 9.39 |
| $N_2$—8% $H_2$ | 1850 | 3 | 93.1 | 5.83 |
| $N_2$—5% $H_2$ | 1850 | 0.5 | 95.6 | 3.25 |
| $N_2$—3% $H_2$ | 1750 | 3 | 95.1 | 4.13 |
| $N_2$—2.5% $H_2$ | 1750 | 3 | 93.7 | 3.82 |
| $N_2$—2% $H_2$ | 1750 | 3 | 86.5 | 2.27 |
| $N_2$—1% $H_2$ | 1750 | 3 | 63.8 | 0.32 |
| $N_2$ | 1750 | 3 | 60.9 | 0.29 |

Table II lists the results of polycrystalline alumina doped with MgO plus $Y_2O_3$ or MgO plus $ZrO_2$, or MgO only, and sintered in a tungsten-element, molybdenum-heat-shield furnace under $N_2$-8% $H_2$. The cross section of the furnace was 12 inch by 6 inch, and the flow rate of $N_2$-8% $H_2$ was 500 cc/min giving a linear gas velocity of about 0.01 meters per minute. The sintering temperature was 1850, 1900, or 1950° C., and the heating rate was approximately 0.5° C./s.

TABLE II

RESULTS OF SINTERING OF ALUMINA UNDER $N_2$—8% $H_2$

| Dopant | Sintering Temp. °C. | Time, h | Transmittance, % Total | In-line | Average Grain Size (m) |
|---|---|---|---|---|---|
| MgO + $Y_2O_3$* | 1850 | 1 | 92.6 | 0.65 | 10.1 |
| MgO + $Y_2O_3$* | 1850 | 3 | 92.4 | 0.65 | 26.1 |
| MgO + $Y_2O_3$* | 1850 | 6 | 93.1 | 0.82 | 39.7 |
| MgO + $Y_2O_3$* | 1900 | 1 | 91.1 | 1.22 | 12.8 |
| MgO + $Y_2O_3$* | 1900 | 3 | 92.3 | 0.74 | 31.8 |
| MgO + $Y_2O_3$* | 1900 | 6 | 93.8 | 1.06 | 53.3 |
| MgO + $Y_2O_3$* | 1950 | 1 | 92.7 | 1.28 | 24.3 |
| MgO + $Y_2O_3$* | 1950 | 2 | 93.4 | 1.46 | 43.4 |
| MgO + $Y_2O_3$* | 1950 | 6 | 94.3 | 1.34 | 66.6 |
| MgO + $Y_2O_3$* | 1900+ | 3 | 90.8 | 0.58 | — |
| MgO + $ZrO_2$‡ | 1950 | 1 | 94.2 | 2.11 | 22.2 |
| MgO** | 1950 | 1 | 84.0 | 2.05 | 17.2 |
| MgO** | 1950 | 2 | 92.2 | 2.24 | 21.4 |

*500 ppm MgO and 500 ppm $Y_2O_3$
+under wet $N_2$—8% $H_2$ (dew point 23° C.)
‡500 ppm MgO and 400 ppm $ZrO_2$
**500 ppm MgO The results of the experiments presented in Table I show that a high degree of translucency was obtained in polycrystalline alumina sintered at 1750° C. for three hours in a $N_2$—$H_2$ atmosphere containing as little as 2.5% $H_2$ by volume. At lower $H_2$ concentrations, the transmittance drops off sharply. In tubes sintered at concentrations of 2.5% or higher, the total transmittance values were similar to those obtained from tubes sintered in $N_2$-8% $H_2$ in a static furnace, as presented in Table II. However, the in-line transmittance of 3-5% in Table I was substantially higher than in the tubes sintered in the static furnace of Table II, in which the linear gas velocity was nearly zero (0.01 m/s). This shows that the in-line transmittance of the sintered body can be significantly enhanced by sintering in a flowing atmosphere.

Table III lists results of MgO-doped, MgO plus $Y_2O_3$-doped, and MgO plus $ZrO_2$-doped alumina sintered in a horizontal alumina tube furnace. The gas flow was 2 liters per minute, corresponding to a linear gas velocity of 1.29 m/s. The sintering temperature was 1700° C. or 1750° C., reached at a heating rate of 0.16°

C./s. The results show that a high degree of translucency in alumina doped with MgO plus $Y_2O_3$ or MgO plus $ZrO_2$ at 1700° C. for 3 hours in an $N_2$—$H_2$ atmosphere containing as little as 2.5% $H_2$ by volume. The transmittance was moderately high in alumina doped with MgO only and sintered at 1750° C. in $N_2$-2.5% $H_2$. However, a higher sintering temperature (e.g. 1950° C.) under $N_2$—$H_2$ atmosphere containing 8% $H_2$ produced highly transmitting MgO-doped $Al_2O_3$. See Table II.

TABLE III

RESULTS OF SINTERING ALUMINA

| Atmosphere | Dopants | Sintering Temp. (°C.) | Time (h) | Transmittance (%) Total | In-line |
|---|---|---|---|---|---|
| $N_2$—5% $H_2$ | MgO + $Y_2O_3$* | 1700 | 3 | 95.3 | 3.46 |
| $N_2$—5% $H_2$ | MgO + $Y_2O_3$* | 1700 | 2 | 95.3 | 2.10 |
| $N_2$—5% $H_2$ | MgO + $Y_2O_3$* | 1700 | 1 | 94.1 | 1.33 |
| $N_2$—5% $H_2$ | MgO† | 1750 | 3 | 84.6 | 0.69 |
| $N_2$—2.5% $H_2$ | MgO† | 1750 | 3 | 84.4 | 0.80 |
| $N_2$—2.5% $H_2$ | MgO + $Y_2O_3$* | 1700 | 2 | 95.8 | 2.35 |
| $N_2$—2.5% $H_2$ | MgO + $Y_2O_3$* | 1700 | 3 | 94.9 | 3.60 |
| $N_2$—5% $H_2$ | MgO + $ZrO_2$‡ | 1700 | 2 | 92.5 | 1.40 |
| $N_2$—2.5% $H_2$ | MgO + $ZrO_2$‡ | 1700 | 3 | 93.6 | 1.72 |

*500 ppm MgO and 500 ppm $Y_2O_3$
† 500 ppm MgO
‡ 500 ppm MgO and 400 ppm $ZrO_2$ Obtaining translucent polycrystalline alumina with optical transmittance within the acceptable limits of 92% to 97% total transmittance and greater than 2% in-line transmittance by sintering under a nitrogen-hydrogen atmosphere in accordance with the present invention was unexpected.

While there has been shown and described what are at present considered to be the preferred embodiments of the invention, it will be obvious to those skilled in the art that various changes and modifications can be made therein without departing from the scope of the invention as defined by the appended claims.

What is claimed is:

1. A process for producing a translucent polycrystalline alumina body comprising:
    sintering a prefired, shaped compacted green body at a maximum sintering temperature in an atmosphere containing nitrogen and an amount of hydrogen greater than or equal to about 2.5 volume percent and less than or equal to 35 volume percent for a period of time sufficient to produce a translucent polycrystalline body, said green body comprising alumina doped with one or more sintering aids.

2. A process in accordance with claim 1 wherein the atmosphere contains nitrogen and an amount of hydrogen greater than or equal to about 2.5 volume percent and less than or equal to about 18 volume percent.

3. A process in accordance with claim 1 wherein the sintering aid is selected from the group consisting of MgO, $Y_2O_3$, $La_2O_3$, $ZrO_2$, $HfO_2$, $Yb_2O_3$, and mixtures thereof.

4. A process in accordance with claim 1 wherein the maximum sintering temperature is from about 1700° to 2000° C.

5. A process in accordance with claim 1 wherein the atmosphere is a flowing atmosphere.

6. A process in accordance with claim 1 wherein the green body is sintered to produce a translucent polycrystalline body having a total transmittance of at least 92% and an in-line transmittance greater than 2%.

7. A process according to claim 1 wherein the atmosphere contains nitrogen and an amount of hydrogen greater than or equal to about 2.5 volume percent and less than or equal to about 8 volume percent.

* * * * *

UNITED STATES PATENT AND TRADEMARK OFFICE
CERTIFICATE OF CORRECTION

PATENT NO. : 4,762,655

DATED : August 9, 1988

INVENTOR(S) : William H. Rhodes, et al

It is certified that error appears in the above-identified patent and that said Letters Patent is hereby corrected as shown below:

On the front page, left-hand column, lines 9-10, item "[73] Assignee:" should read: --GTE Products Laboratories Incorporated and GTE Laboratories Incorporated--.

Signed and Sealed this

Thirty-first Day of July, 1990

Attest:

HARRY F. MANBECK, JR.

Attesting Officer

Commissioner of Patents and Trademarks